Aug. 31, 1937.  C. L. HOWSE ET AL  2,091,319
LIQUID LEVEL INDICATOR
Filed Jan. 15, 1935   3 Sheets-Sheet 3
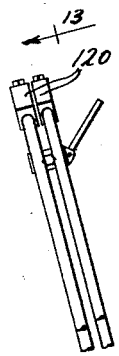
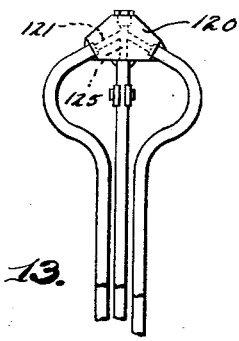
Fig. 13.
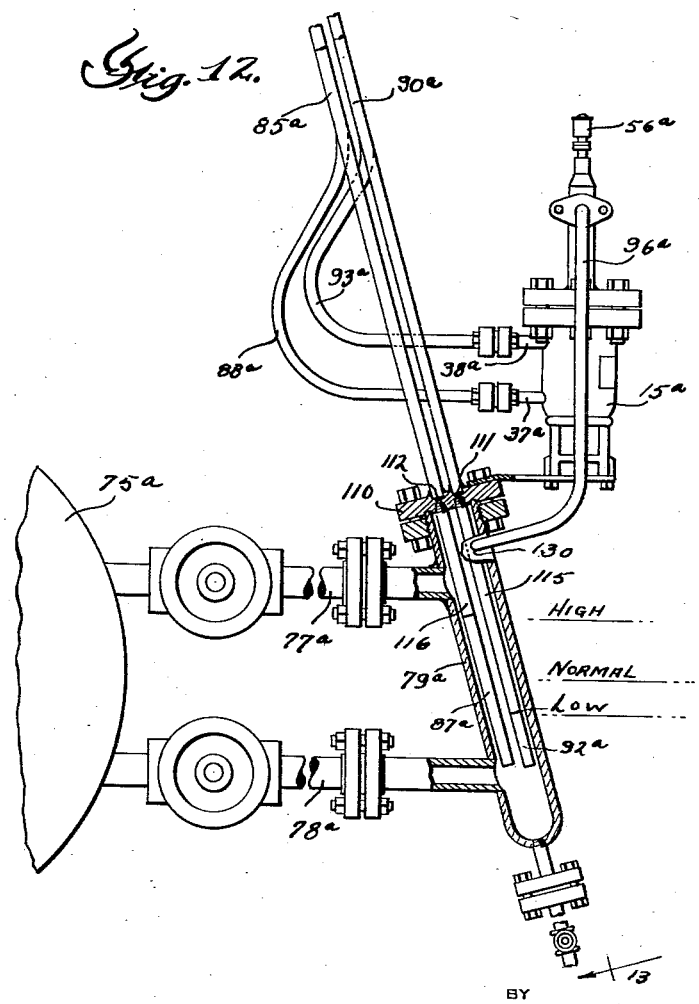
Fig. 12.
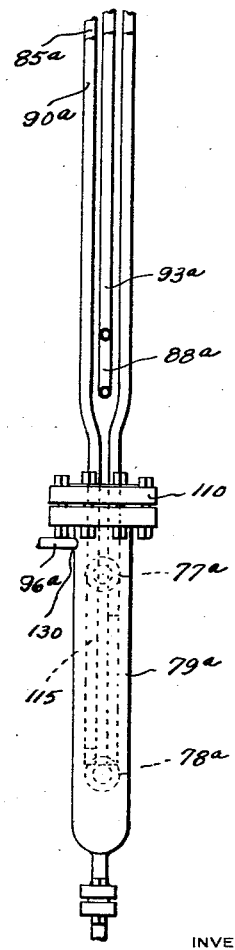
INVENTORS
CURTIS L. HOWSE
HARRY E. BRELSFORD
BY
Charles B. Belknap
ATTORNEY Patented Aug. 31, 1937

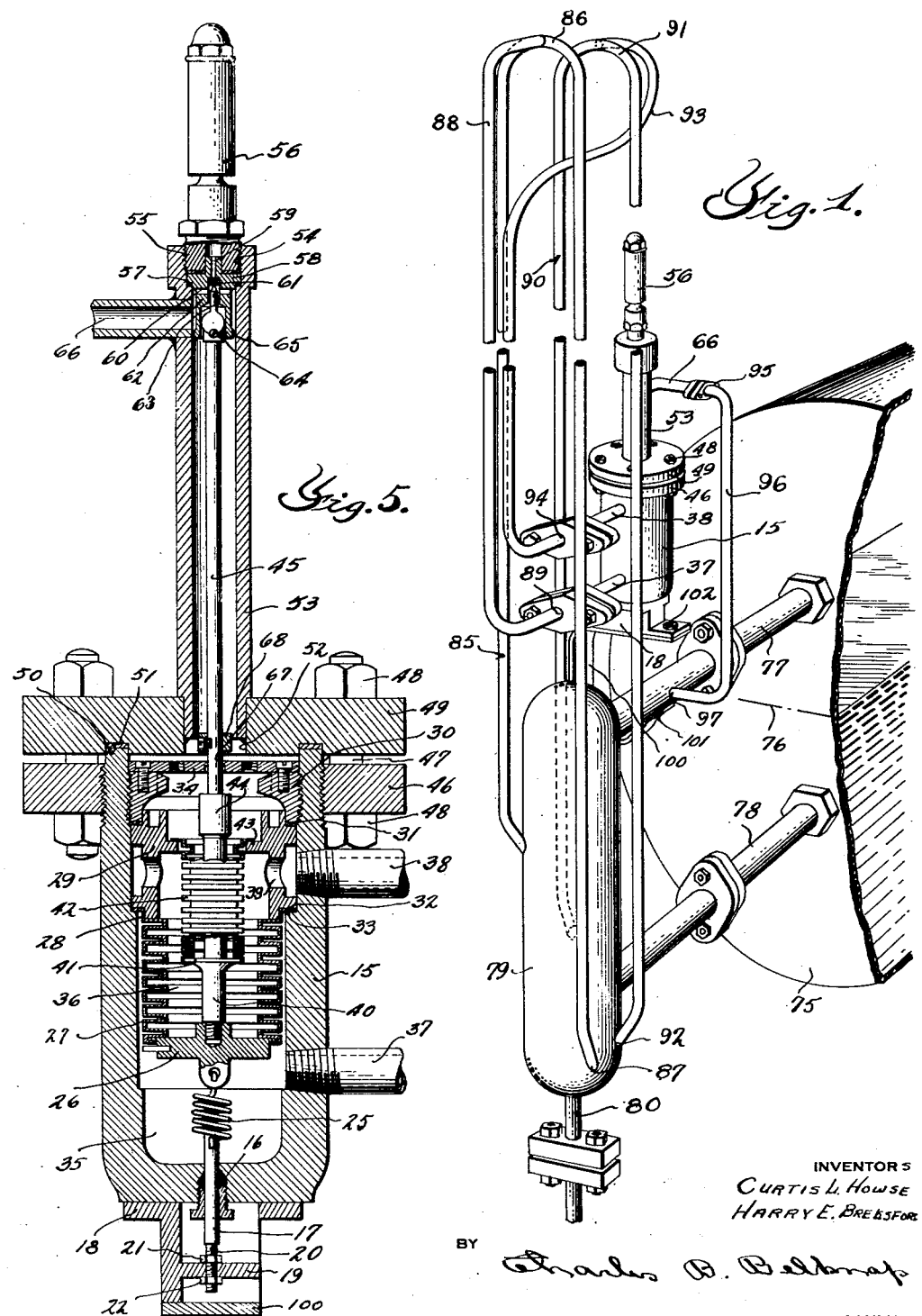

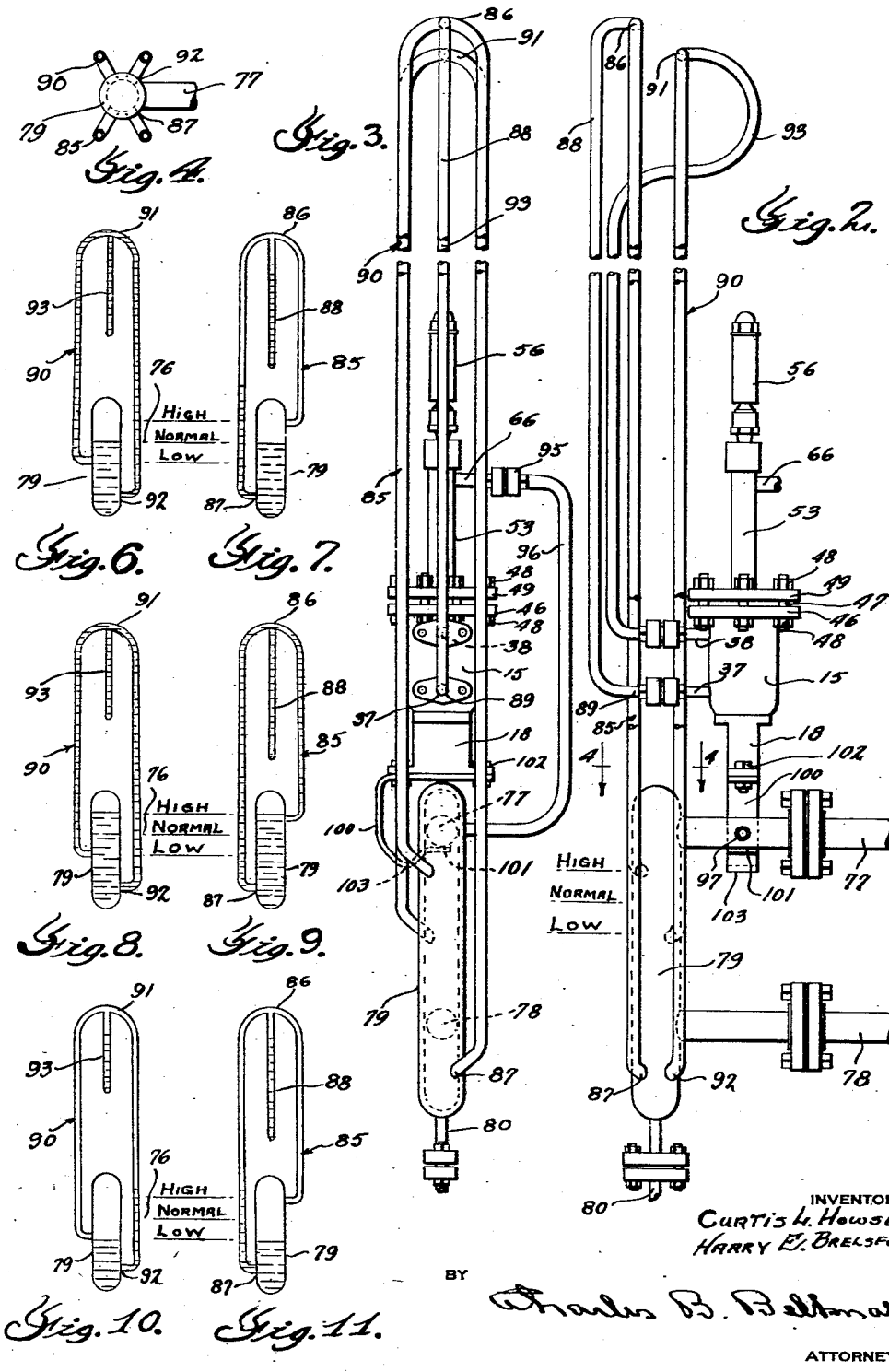

2,091,319

UNITED STATES PATENT OFFICE 2,091,319

LIQUID LEVEL INDICATOR

Curtis L. Howse, Detroit, and Harry E. Brelsford, Birmingham, Mich., assignors to Diamond Power Specialty Corporation, Detroit, Mich., a corporation of Michigan Application January 15, 1935, Serial No. 1,972

8 Claims. (Cl. 137—102)

This invention relates to liquid level indicators and has particular reference to a liquid level indicator which may be utilized to actuate alarms or the like upon predetermined changes in the level of the liquid being measured.

One of the primary objects of this invention is to provide a liquid level indicator which will respond rapidly to changes in the level of the liquid being measured.

A further object of this invention is to provide an indicator of the above mentioned character in which relatively small conduits may be utilized in associating the indicator with the container in which the liquid level is to be measured.

Still further the invention contemplates the provision of a liquid level indicator having means for eliminating, during actuation of the indicator, excessive increases in the level of the liquid in the container to which the indicator is connected.

Numerous other objects and advantages of this invention will become more apparent as the following description proceeds particularly when reference is had to the accompanying drawings wherein Fig. 1 is a fragmentary perspective view of a liquid container showing an indicator constructed in accordance with the teachings of this invention associated with the same;

Fig. 2 is a side elevational view of the indicator shown in Fig. 1;

Fig. 3 is a front elevational view of the indicator;

Fig. 4 is a fragmentary sectional view taken on the line 4—4 of Fig. 2;

Fig. 5 is an enlarged sectional view through the pressure responsive device forming a part of the indicator;

Figs. 6 to 11 inclusive are diagrammatic views illustrative of the operation of the device;

Fig. 12 is a side elevational view partly in section of a slightly modified form of construction; and Fig. 13 is a sectional view taken substantially on the line 13—13 of Fig. 12.

Referring then particularly to the drawings wherein like reference characters designate corresponding parts throughout all views, there is shown in Fig. 5 a pressure actuated device which when properly connected to a liquid container is adapted to actuate a suitable alarm when the level of the liquid in the container reaches predetermined high or low points. This pressure responsive device forms no part of the present invention but rather constitutes the subject matter of the application Serial Number 672,020, filed by Curtis L. Howse on May 20, 1933, the application being entitled "Liquid level indicator".

The present invention is directed more particularly to improvements in the means for supporting and for connecting the pressure responsive device to the container in which the level of the liquid is to be measured.

The pressure responsive device comprises a casing or housing 15, closed at its lower end except for a packed opening 16 through which projects a rod 17. Fixed to the lower end of the housing 15 is a bracket 18 having a web 19 through which the rod 17 extends, the rod being threaded as at 20 and being provided with adjusting nuts 21 and 22 which engage the web to provide for longitudinal adjustment of the rod 17.

Secured to the upper end of the rod 17 and disposed within the housing 15, is a spring 25 which is made preferably of a copper-beryllium alloy, or of any composition capable of withstanding the mechanical forces to which it is subjected and the corrosive agencies which are present in the housing. The other end of this spring is connected to a plate 26 which is mounted for vertical movement within the housing 15. This plate is secured to and constitutes the bottom of a bellows 27 and the upper end of this bellows is connected as at 28 to a cylindrical member 29, which is disposed in the upper end of the housing 15. The member 29 is held in proper position by a lock nut 30 which is threaded in the upper end of the housing 15 and there is preferably provided a packing between this lock nut and the member 29 as at 31 and packing between the member 29 and a shoulder 32 formed on the interior of the housing, this latter packing being designated by the reference character 33. A guide plate 34 is secured as for example, by suitable bolts, to the top of lock nut 30 as clearly illustrated in Fig. 5 of the drawings.

The bellows 27 and plate 26 divide the interior of the housing 15 into two chambers, which for the sake of convenience are designated by the reference characters 35 and 36. A conduit 37 communicates with the chamber 35 and with the container in which the level of the liquid is to be measured as will be hereinafter more fully described.

A second conduit 38 is tapped into the housing 15 adjacent the member 29 and this member is provided with openings 39 whereby the conduit 38 is in communication with the second chamber 36.

Secured to the plate 26 and extending interiorly of the bellows 27 is a rod or stem 40. This rod is provided intermediate its ends with an enlarged flange 41 and secured to this flange as by welding or the like is the lower end of a bellows 42. The upper end of this bellows is secured, as by welding or the like, to an inwardly extending flange 43 on the member 29. The rod 40 extends through the bellows 42 and is connected as at 44 to the lower end of a stem 45 which is connected to the alarm as will now be described.

Threaded on the upper end of the housing 15 is an annular member 46. Disposed above this member and secured thereto by suitable bolts 47 and nuts 48 is a cover plate 49, this cover plate being preferably grooved as at 50 to receive suitable packing 51 and the upper edge of the housing 15. Thus a fluid tight closure is provided for the housing 15 as will be readily apparent.

Formed in the cover plate and preferably centrally thereof, is an opening 52 and fixed as by welding or the like in this opening is the lower end of a tube 53. The upper end of this tube is counterbored as at 54, this counterbore being threaded to receive the lower threaded end 55 of a whistle 56. Secured in the upper end of tube 53 between a shoulder 57 formed interiorly of the tube and the lower end 55 of the whistle is a valve body 58 provided with bores 59 and 60 and a valve seat 61. The valve body has a depending portion 62 which constitutes a guide for a valve 63 which cooperates with the valve seat, this valve being pivotally connected to the upper end of the rod 45 as at 64.

The lower end of the extension 62 is flanged as at 65 to substantially close the passage through the tube 53 and tapped into the tube 53 above the flange 65 is a conduit 66 for a purpose which will hereafter be more fully described.

It is to be noted that the rod 45 extends upwardly through an opening 67 in the guide plate 34 and that there is fixed to the rod 45 a stop collar 68 which limits downward movement of the rod 45.

It will be noted that valve 63 controls communication between bores 59 and 60 and that bore 59 is in communication with the whistle 56. Fluid entering the upper end of tube 53 by way of conduit 66 flows into passages 60 and from these passages into bore 59 when the valve 63 is moved to its open position.

The tube 53 is preferably made relatively long so that the alarm 56 will be located a substantial distance from the housing 15 and the mechanism in the housing. The length of the tube 53 acts to prevent the contact of the hot steam in the upper end of tube 53 with the mechanism in the housing 15, while the flange 65 serves to reduce convection currents through the tube.

As thus far described, the structure is substantially identical with that described and claimed in the said application filed by Curtis L. Howse. In the previously filed application, the conduit 37 is connected to the container, the level of whose liquid is to be measured, above the normal level of the liquid in the container, while the conduit 38 is connected to the container below the normal level of the liquid therein. The nipple 66 is connected to a suitable source of steam for actuating the whistle 56, this source being the vapor space of the container when the container is a boiler or the like.

In the previously described construction, however, the conduits 37 and 38 were single conduits leading to the container and while they function efficiently to effect an actuation of the mechanism in housing 15 upon predetermined changes of the level of the liquid in the container, the response of the mechanism was not as rapid as might be desired. Therefore, one of the primary objects of this invention is to provide an improved means for connecting conduits 37 and 38 to the liquid container, to the end that the mechanism in the housing 15 will respond instantly should the level of the liquid in the container reach the predetermined high or low point.

Referring now to Figs. 1, 2, and 3 of the drawings, the numeral 75 designates a container which may be a boiler drum or the like. The liquid in the container is diagrammatically illustrated and the normal level of this liquid is designated by the line 76.

Communicating with the container 75, above and below the normal level of the liquid therein as by conduits 77 and 78, is a liquid column 79 with the result that the level of the liquid in the column 79 is always the same as that in the container 75. Column 79 is provided with a suitable drain 80 which may be controlled by a valve (not shown) in accordance with the usual practice.

Communicating with the column 79 above the normal level of the liquid therein and at the desired high level point is a conduit 85. This conduit extends upwardly above the column 79, is return bent as at 86 and then extends downwardly and communicates with the lower end of the column 79 as at 87. Communicating with the return bent portion 86 of this conduit is a conduit 88 which extends downwardly and is connected as at 89 to the conduit 37.

Communicating with the column 79 below the normal level of the liquid therein, and at the low level point is a conduit 90. This conduit extends upwardly to a point above the column, is return bent as at 91 and then extends downwardly and communicates with the lower end of the column 79 as at 92. Communicating with the return bent portion of this conduit is a conduit 93 which is connected as at 94 to the conduit 38.

For supplying fluid under pressure to the bores 59 and 60 to actuate the whistle 56, the conduit 66 is connected as at 95 to a conduit 96 which communicates with the pipe 77 as at 97. Thus the conduit 96 is connected to the vapor space of the container which in a boiler drum is of course the steam space.

It is preferable to mount the housing 15 on a flexible support to permit equalization of heat strains in the piping which connects this housing to the column 79 and for this purpose there is provided a bracket 100 which is secured to the piping 77 as at 101 and to the bracket 18 as at 102. The bracket 100 is provided with a return bent portion 103 to provide the desired resiliency.

Before proceeding with a description of the operation of the construction, it might be stated first that the actuation of the alarm is dependent upon the relative pressures established in chambers 35 and 36 within housing 15. As previously brought out, the conduit 85 communicates with the column 79 at the high level point or in other words, at such a point that when the level of the liquid in the column reaches the open end of conduit 85, the alarm will be actuated. The conduit 90 communicates with the column 79 at the low level point, the arrangement being such that when the level of the liquid falls below the open end of conduit 90, the alarm is actuated. It will be apparent that any desired range of rising and falling of the level of the liquid in the container may be obtained by tapping the conduits 85 and 90 into the column 79 at the desired points.

With the liquid in the container at its normal level, the inlet end of conduit 90 will be below the level of the liquid in the column, and this conduit will be filled with the liquid as illustrated in Fig. 6 of the drawings. Since this conduit communicates with the chamber 36 by way of conduit 83 and nipple 38, it will be apparent that the upper side of plate 26 will be subjected to the pressure in the container 75 minus the head established by the column of liquid in conduit 90.

Conduit 85 will communicate with column 79 above the level of the liquid therein and will be substantially free of liquid as indicated in Fig. 7 of the drawings. Since this conduit communicates with chamber 35 by way of conduit 88 and nipple 37, it will be apparent that the underface of plate 26 will be subjected to the full pressure in the container 75 and thus to a slightly higher pressure than the chamber 36. This slightly increased pressure on the underface of plate 26 is sufficient to overcome the tendency of spring 25 to open valve 63 and will thus hold valve 63 closed.

If now the level of the liquid should rise to the high level point it will be apparent that the conduit 85 will then become filled with liquid as diagrammatically illustrated in Fig. 9 of the drawings. Since the conduit 90 is of course, filled with liquid as indicated in Fig. 8, it will be apparent that the chambers 35 and 36 will both be subjected to substantially the same pressure, namely, that present within the container minus the head of the columns of liquid in conduits 85 and 90.

Under these conditions, the plate 26 will have its opposite faces subjected to substantially equal pressures whereupon the spring 25 will pull the plate 26 downwardly, this movement being transmitted to the valve 63 by means of stems 40 and 45. Obviously, upon opening the valve 63, the fluid under pressure supplied to bores 60 by way of conduits 66 and 96 will be supplied to the whistle 56 to actuate the latter. Thus upon an increase in the level of the liquid to the high level point, the alarm will be actuated.

Should the level of the liquid fall to the low level point so as to uncover the inlet end of conduit 90, it will be apparent that the liquid in this conduit will drain from the same as diagrammatically illustrated in Fig. 10 of the drawings. Obviously, conduit 85 will be drained of liquid as indicated in Fig. 11 of the drawings, with the result that chambers 35 and 36 will be subjected solely to the pressure in the container 75. Under this condition, obviously, opposite faces of plate 26 will be subjected to substantially the same pressure with the result that spring 25 will pull the plate 26 downwardly thus effecting an opening of valve 63 and an actuation of the alarm.

In the application previously mentioned, the actuation of the alarm was identical with that above described. In that application, however, the housing 15 was connected to the container 75 by single conduits, there being no return drain pipes provided such as the conduits which communicate with the column 79 at 87 and 92.

While the construction disclosed in the said application functions it was somewhat slow in responding to the predetermined changes in the level of the liquid because of the fact that the single conduits had to drain before they could be filled with the vapor or steam from the container. Thus the liquid would run down one side of the conduit as fast as it was displaced by the vapor passing in the opposite direction up the other side of the conduit. This naturally slowed up the actuation of the construction and further necessitated the use of relatively large conduits.

With the present construction however, it will be noted that the conduits connecting the housing 15 to the column 79 are inverted U-shaped loops. One leg of each loop extends downwardly to a point lower than the other leg and is connected to the water column at the lower end thereof. As the water both in the water column and in these legs of the loops will be somewhat cooler than the water higher up in the water column and in the other legs of the loops, the liquid in the loops is urged positively in a downward direction whenever the shorter legs of the loops are placed in communication with the vapor space of the liquid container.

Thus with the present construction, the instant that either of the shorter legs of the loops are placed in communication with the vapor space of the container, the vapor rushing up these legs acts to force the water therein down the other longer legs and back into the column 79. Thus the loops are rapidly emptied and the pressures in chambers 35 or 36 are thus changed at substantially the instant that the liquid level reaches the high or low point. This naturally results in a rapid actuation of the mechanism in the housing 15 with the result that lag in the actuation of the alarm is substantially eliminated.

Additionally, it will be apparent that the conduits 85 and 90 and their connections may be formed of pipe with a very small bore and this decreases the amount of liquid that has to flow from the water column 79 back into the boiler drum upon actuation of the device. This decrease in the amount of water emptied into the water column obviously decreases the building up of the water level in the water column at the instant that either loop is emptying.

In the embodiment of the invention which has been described, the conduits 85 and 90 and their drain connections have been illustrated as being substantially vertically disposed and thus at right angles to the horizontal. It will be apparent however, that these conduits need not necessarily be so arranged and in Figs. 12 and 13 of the drawings there is disclosed an installation in which the conduits are disposed at an inclination to the horizontal.

Additionally, in Figs. 12 and 13 the conduits and their drain connections communicate with the liquid column through the top thereof rather than through the side as previously described.

Referring then particularly to Figs. 12 and 13, there is disclosed a liquid column 79a which is disposed at an inclination to the vertical and which is connected by conduits 77a and 78a to the liquid container 75a above and below the normal level of the liquid therein.

As illustrated, the liquid column is provided with a cover plate 110 and formed in this cover are bores 111 and 112. Secured to the cover and projecting interiorly of the liquid column is a tube 115. This tube communicates with the bore 111 and its lower end terminates within the liquid column at the desired low level point.

Secured to the cover plate 110 and communicating with the bore 112 is a tube 116. This tube projects interiorly of the liquid column and its lower open end is disposed at the desired high level point.

Secured to the cover plate and projecting at an inclination upwardly therefrom are conduits 85ª and 90ª, these conduits corresponding to the conduits 85 and 90 in the embodiment of the invention first described. The conduit 85ª communicates with the bore 112 and thus with the tube 116 while the conduit 90ª communicates with the bore 111 and thus with the tube 115.

At their upper ends the conduits 85ª and 90ª are fixed to suitable fittings 120, each fitting being provided with a bore 121 which communicates with its respective conduit. The drain connections for the conduits 85ª and 90ª are secured to the fittings 120 and communicate with the bores 121 therein as illustrated in Fig. 13 of the drawings. These drain connections extend downwardly to the cover plate 110 and communicate with openings therein as indicated in Fig. 13 of the drawings.

Communicating with the drain connection for the pipe 85ª through its respective bore in the cover plate 110 is a tube 87ª which projects interiorly of the liquid column to a point substantially even with the top of the opening through conduit 78ª. A second tube 92ª projects interiorly of the liquid column and at its lower end terminates on a level with the lower end of tube 87ª and at its upper end communicates through the cover 110 with the drain for conduit 90ª.

Formed in each fitting 120 is bore 125 which communicates with the bore 121 in its respective fitting. A conduit 88ª connects the bore 125 in the fitting associated with conduit 85ª to the nipple 37ª while a conduit 93ª connects the bore 125 in the fitting associated with conduit 90ª with the nipple 38ª. As in the previously described form of construction there is associated with the housing 15ª, an alarm such as a whistle 56ª. For supplying steam from the boiler drum to this whistle there is provided conduit 96ª which in this embodiment of the invention is tapped into the top of the water column as at 130.

It will be apparent that this modified embodiment of the invention will operate precisely as does the first described embodiment. The alarm mechanism will be actuated upon predetermined changes in the level of the liquid in the boiler and whenever conduits 85ª or 90ª are placed in communication with the steam space of the boiler, the steam rushing up these conduits will force the water therein down through the drain conduits to the lower end of the liquid column.

While the invention has been described with some detail, it will be understood that the description is for the purposes of illustration only and is not definitive of the limits of the inventive idea. The right is reserved to make such changes in the details of construction and arrangement of parts as will fall within the purview of the attached claims.

What we claim as our invention is:

1. In a device for indicating variations from a normal desired level of liquid in a boiler drum, a housing, means dividing the interior of the housing into a plurality of separate zones, a conduit establishing communication between one of said zones and the vapor space of the boiler, a second conduit establishing communication between another of said zones and the liquid space of the boiler, an alarm, means operable when communication is established between either of said zones and the space in the boiler with which said zones are not normally in communication to actuate said alarm, and drain conduits directly connected and opening into said first mentioned conduits for draining the same into said boiler.

2. In a device for indicating variations from a normal desired level of liquid in a boiler drum, a housing, means dividing the interior of the housing into a plurality of separate zones, a conduit establishing communication between one of said zones and the vapor space of the boiler, a second conduit establishing communication between another of said zones and the liquid space of the boiler, an alarm, means operable when communication is established between either of said zones and the space in the boiler with which said zones are not normally in communication to actuate said alarm, and a conduit directly connected and opening into each of said first mentioned conduits and communicating with the boiler adjacent the lower end thereof.

3. In a device for indicating variations from a normal desired level of liquid in a container, a housing, pressure responsive means dividing said housing into two chambers, an alarm actuated by said pressure responsive means upon movement thereof, a conduit connecting one of said chambers to the container above the normal level of the liquid therein, a second conduit connecting the other of said chambers, to the container below the normal level of the liquid therein, both of said conduits being disposed at an angle to the horizontal, and direct drain connections for said conduits having their discharge ends opening into the container but spaced from the points of connection of said conduits with said container.

4. In a device for indicating the level of a liquid in a container, a housing, pressure responsive means dividing the interior of the housing into two chambers, an alarm actuated by said pressure responsive means upon movement thereof, a conduit connected to said container above the level of the liquid therein, said conduit extending upwardly from said container and being return bent above the container to provide a depending leg which is connected to the container near the lower end thereof, a connection between the return bent portion of said conduit and one of the chambers in said housing, a second conduit connected to the container below the normal level of the liquid therein, said second conduit extending upwardly from said container and being return bent at a point above the container to provide a depending leg which is connected to the container adjacent the lower end thereof, and a connection between the return bent portion of said second conduit and the other chamber within the housing.

5. In a device for indicating the level of a liquid in a container, a housing, pressure responsive means dividing the interior of the housing into two chambers, an alarm actuated by said pressure responsive means upon movement thereof, a conduit connected to said container above the level of the liquid therein, said conduit extending upwardly from said container and being return bent above the container to provide a depending leg which is connected to the container near the lower end thereof, a connection between the return bent portion of said conduit and one of the chambers in said housing, a second conduit connected to the container below the normal level of the liquid therein, said second conduit extending upwardly from said container and being return bent at a point above the container to provide a depending leg which is connected to the container adjacent the lower end thereof, a connection between the return bent portion of said second conduit and the other chamber within the housing, and a bracket providing a flexible support for said housing to provide for equalization of heat strains in the said conduits.

6. In a device of the character described, a housing, pressure responsive means dividing the interior of the housing into two chambers, an alarm actuated by said pressure responsive means upon movement thereof, a boiler, a liquid column connected to said boiler above and below the normal level of the liquid therein, a conduit communicating with said liquid column at a predetermined desired high level point and extending upwardly therefrom at an inclination to the vertical, a connection between said conduit and one of the chambers in said housing, a second conduit communicating with the liquid column at a predetermined low level point and extending upwardly therefrom at an inclination to the vertical, a connection between said last mentioned conduit and the other chamber in the housing, and drain conduits directly connected and opening into said first mentioned conduits and communicating with the liquid column adjacent the lower end thereof.

7. In a device for indicating variations from a normal desired liquid level in a container, a pressure responsive device, an alarm arranged to be actuated by said pressure responsive device, a conduit placing said pressure responsive device in communication with the container, said conduit having a portion extending upwardly above the container and said conduit being connected to the container at such a point that it will communicate with the vapor space or the liquid space of the container depending upon the level of the liquid in the container, and a second conduit directly connected and opening into said first mentioned conduit and having a discharge end opening into said container at a point spaced from the point of connection of the first mentioned conduit with the container, said second mentioned conduit being adapted to drain the first mentioned conduit when the latter is in communication with the vapor space of the container.

8. In a device for indicating variations from a normal desired level of liquid in a boiler drum, a housing, means dividing the interior of the housing into two separate zones, a conduit establishing communication between one of said zones and the normal vapor space of the boiler, a second conduit establishing communication between the other of said zones and the normal liquid space of the boiler, both of said conduits having portions extending upwardly above the boiler drum, an alarm, means operable when communication is established between either of said zones and the space in the boiler with which said zones are not normally in communication to actuate said alarm, and a drain conduit directly connected and opening into each of said first mentioned conduits, said drain conduits having their discharge ends opening into the boiler but spaced from the points of communication of said first mentioned conduits with the boiler.

CURTIS L. HOWSE.
HARRY E. BRELSFORD.